(12) United States Patent
Uematsu et al.

(10) Patent No.: US 7,368,892 B2
(45) Date of Patent: May 6, 2008

(54) METHOD AND APPARATUS FOR CONTROLLING POWER GENERATION USING GRADUALLY EXCITING TECHNIQUE

(75) Inventors: Tadashi Uematsu, Gamagoori (JP); Toshiyo Teramoto, Okazaki (JP)

(73) Assignee: Denso Corporation, Kariya (JP)

( * ) Notice: Subject to any disclaimer, the term of this patent is extended or adjusted under 35 U.S.C. 154(b) by 250 days.

(21) Appl. No.: 11/386,780

(22) Filed: Mar. 23, 2006

(65) Prior Publication Data

US 2006/0238143 A1    Oct. 26, 2006

(30) Foreign Application Priority Data

Mar. 23, 2005    (JP) .............................. 2005-084893

(51) Int. Cl.
*H02H 7/06* (2006.01)
(52) U.S. Cl. .................... 322/27; 322/28; 322/25; 322/61; 322/17
(58) Field of Classification Search ............ 322/25, 322/27, 28, 29, 37–39, 59–61, 69, 75, 86, 322/88; 315/78–80, 77
See application file for complete search history.

(56) References Cited

U.S. PATENT DOCUMENTS 5,886,500 A * 3/1999 Iwatani et al. ............. 320/104

7,078,881 B2 * 7/2006 Aoyama ...................... 322/28

FOREIGN PATENT DOCUMENTS

| JP | A 06-311798 | 11/1994 |
|----|-------------|---------|
| JP | A 09-107640 | 4/1997  |

* cited by examiner

*Primary Examiner*—Tuyet Vo
(74) *Attorney, Agent, or Firm*—Oliff & Berridge, PLC

(57) ABSTRACT

A generation control apparatus for vehicles is provided, in which a drastic change in the drive torque of a generator, which occurs with the cancellation of gradual excitation immediately after starting an internal combustion engine, can be suppressed to prevent stoppage of the internal combustion engine. The generation control apparatus includes an engine-start detection circuit, a gradual excitation circuit, a comparator for gradual-excitation cancellation, and a masking circuit for gradual-excitation cancellation. After detecting an engine start by the engine-start detection circuit, an instruction for gradual-excitation cancellation is released during an initial gradual excitation performed by a gradual excitation circuit, based on an output from the masking circuit for gradual-excitation cancellation. The drastic change in the drive torque occurring with the cancellation of the gradual excitation immediately after the engine start, can thus be suppressed, thereby preventing the engine stop.

18 Claims, 3 Drawing Sheets

METHOD AND APPARATUS FOR CONTROLLING POWER GENERATION USING GRADUALLY EXCITING TECHNIQUE

CROSS-REFERENCE TO RELATED APPLICATION

This application is based on and claims the benefit of priority from earlier Japanese Patent Application No. 2005-084893 filed on Mar. 23, 2005, the description of which is incorporated herein by reference.

BACKGROUND OF THE INVENTION

1. Technical Field of the Invention

The present invention relates to a method and apparatus for controlling power generated by a generator for vehicles, and in particular, to the method and apparatus for controlling the power generation based on a gradual excitation technique which requires the generator to be control on gradually changed excitation currents after its start.

2. Prior Art

In vehicles that run with a driving force, the conditions of an on-vehicle engine immediately after its start are unstable. On the other hand, immediately after the start, a power generation control unit on the vehicle allows an increase of excitation current of the engine-driven generator and allows commencement of power generation in order to raise voltage of the battery to a predetermined level. Upon commencement of power generation, torque of the generator is Increased, which tends to cause failure in starting the engine at low temperatures particularly in a cold morning, for example.

Generally known power generation control units for vehicles include one, for example, in which gradual excitation is performed by gradually increasing the excitation current (i.e., gradually exciting technique) at the time of starting to suppress drastic increase of drive torque of the generator, and to improve startability. In such a generation control unit, the gradual excitation is carried out as required, not only at the time of starting the engine, but also when an electric load(s) (i.e., current consumer) has increased. Japanese Unexamined Patent Application Publication No. 6-311798 discloses a generation control unit for vehicle, in which, compared to gradual excitation control performed for an increase in the amount of the load during the normal generation control (i.e., control except for the engine start), a rate of increasing the excitation current is decreased during gradual excitation when an internal combustion engine is started.

In cases where power consumption of current consumers is further increased during such a gradual excitation operation, under which the magnitude of power generation is suppressed, the voltage of the battery is considerably reduced, likely to disable the operations of the current consumers. If an engine control unit is disabled, the engine is stopped.

In contrast, Japanese Unexamined Patent Application Publication No. 9-107640, for example, discloses a power generation control unit for vehicle, in which the gradual excitation is cancelled when the voltage of the battery is reduced to not more than a predetermined voltage to drastically increase the excitation current, so that the battery is suppressed from reducing voltage.

Since power consumption of an engine starting system is very large, battery voltage is significantly reduced at an engine start. In the power generation control unit disclosed in Japanese Unexamined Patent Application Publication No. 9-107640 mentioned above, during a gradual excitation at an engine start, the gradual excitation is cancelled due to such a battery voltage reduction, so as to drastically increase the excitation current. Therefore, drive torque of the generator is also drastically increased, which may cause the engine in an unstable state to stop.

SUMMARY OF THE INVENTION

The present invention has been made in view of such circumstances, and has an object of providing a power generation unit for vehicles which enables suppression of an abrupt change of drive torque that occurs immediately after starting up the internal combustion engine, being induced by the cancellation of gradual excitation, and thus enables prevention of the stoppage of the internal combustion engine.

As a result of committing research through a trial and error process for achieving the object, the inventors conceived an idea of suppressing the abrupt change in the drive torque of a generator at the time of starting the internal combustion engine, by inhibiting cancellation of gradual excitation during an initial gradual excitation performed immediately after the engine start, and completed the present invention.

To achieve the foregoing object, as one aspect, the present invention provides an apparatus for controlling power to be generated by a generator driven by an internal combustion engine. The apparatus comprise: excitation current control means for controlling an excitation current to be fed to the generator so that the generator produces the power whose voltage is set to a first predetermined voltage value; gradual excitation means for enabling the excitation current to increase gradually when the excitation current is controlled by the excitation current control means; gradual-excitation cancellation means for canceling the gradual excitation in cases where the voltage of the power generated by the generator becomes less than a second predetermined voltage value lower than the first predetermined voltage value during the gradual excitation performed by the gradual excitation means; start detecting means for detecting that the internal combustion engine has been started; and gradual-excitation cancellation inhibiting means for inhibiting the gradual-excitation cancellation to be performed by the gradual-excitation cancellation means, during the gradual excitation first performed by the gradual excitation means which comes after the start of the internal combustion engine to be detected by the start detecting means.

Thus, during the initial gradual excitation performed immediately after detection of the start of the internal combustion engine, cancellation of the gradual excitation can be inhibited. Specifically, the abrupt change in the drive torque of the generator which is induced by the cancellation of the gradual excitation can be suppressed during the initial gradual excitation performed immediately after starting the internal combustion engine. Accordingly, in an unstable state that follows the engine start, stoppage of the internal combustion engine caused by the abrupt change in the drive torque of the generator can be prevented.

It is preferable that the gradual-excitation cancellation inhibiting means comprises inhibition releasing means for releasing the inhibition of the gradual-excitation cancellation on the basis of either the voltage of the power to be generated or the excitation current.

Inhibition of the cancellation of the gradual excitation can thus be efficiently released without allowing the inhibition to continue for more than necessary. Specifically, revolution of the internal combustion engine immediately after starting is unstable, which however is stabilized with the passage of time. In the meantime, generation voltage and excitation current gradually increase immediately after starting owing to the gradual excitation. Accordingly, by releasing the inhibition of the gradual-excitation cancellation on the basis of the generation voltage and the excitation current, the inhibition of the gradual-excitation cancellation can be efficiently released without allowing the inhibition to continue for more than necessary.

Preferably, the inhibition releasing means is configured to release the inhibition of the gradual-excitation cancellation in cases where the voltage of the power to be generated exceeds the first predetermined voltage value.

Thus, the timing for releasing the inhibition of the gradual-excitation cancellation can be determined in a convincing way based on the generation voltage. Specifically, when the generation voltage of the generator becomes greater than the first predetermined voltage value, the initial gradual excitation is terminated. By that time, revolution of the internal combustion engine should be sufficiently stabilized, ensuring reliable determination on the timing for releasing the inhibition of the gradual-excitation cancellation.

Still preferably, the inhibition releasing means is configured to release the inhibition of the gradual-excitation cancellation in cases where the excitation current exceeds a predetermined current value.

Thus, the timing for releasing the inhibition of the gradual-excitation cancellation can be determined in a convincing way based on the excitation current. Specifically, by the time the excitation current of the generator becomes sufficiently greater than the predetermined current value, the revolution of the internal combustion engine should be sufficiently stabilized. The timing for releasing the inhibition of the gradual-excitation cancellation can thus be reliably determined.

It is also preferred that the excitation current control means is configured to control the excitation current by adjusting an active-period rate at which the excitation current becomes active and the inhibition releasing means includes means for deciding an amplitude of the excitation current based on the active-period rate of the excitation current.

Thus, the amplitude of the excitation current can be reliably determined. Specifically, since the excitation current of the generator changes with the active-period rate of the excitation current, the amplitude of the excitation current can be determined on the basis of the active-period rate of the excitation current.

For example, the internal combustion engine is mounted on a vehicle. Thus, in a vehicle, the internal combustion engine can be prevented from stopping immediately after the engine start, being induced by the abrupt change in the drive torque of the generator, thereby improving startability of the internal combustion engine.

As another aspect, the present invention provides a method of controlling power to be generated by a generator driven by an internal combustion engine, comprising steps of: controlling an excitation current to be fed to the generator so that the generator produces the power whose voltage is set to a first predetermined voltage value; enabling the excitation current to increase gradually when the excitation current is controlled; canceling the gradual excitation in cases where the voltage of the power generated by the generator becomes less than a second predetermined voltage value lower than the first predetermined voltage value during the gradual excitation; detecting that the internal combustion engine has been started; and inhibiting the gradual-excitation cancellation to be performed, during the gradual excitation first performed in the gradual excitation step which comes after the start of the internal combustion engine to be detected in the start detecting step.

Preferably, the gradual-excitation cancellation inhibiting step includes a step of releasing the inhibition of the gradual-excitation cancellation on the basis of either the voltage of the power to be generated or the excitation current.

DETAILED DESCRIPTION OF THE PREFERRED EMBODIMENTS

Hereinafter is described in detail an embodiment of the power generation control unit for vehicle related to the present invention, with reference to the accompanying drawings.

Figure 1:
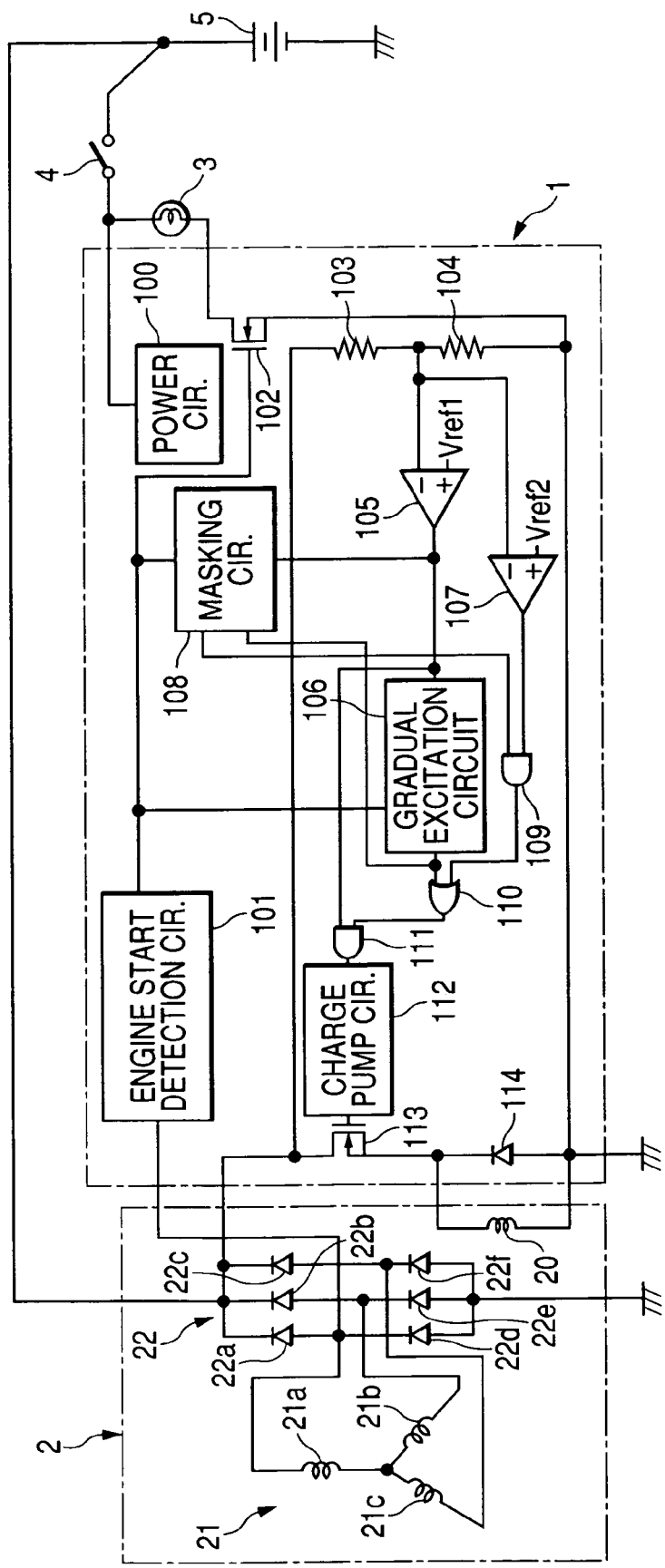
FIG. 1 is a schematic circuit diagram of a power generation control unit for vehicle according to an embodiment of the present invention.
Figure 2:
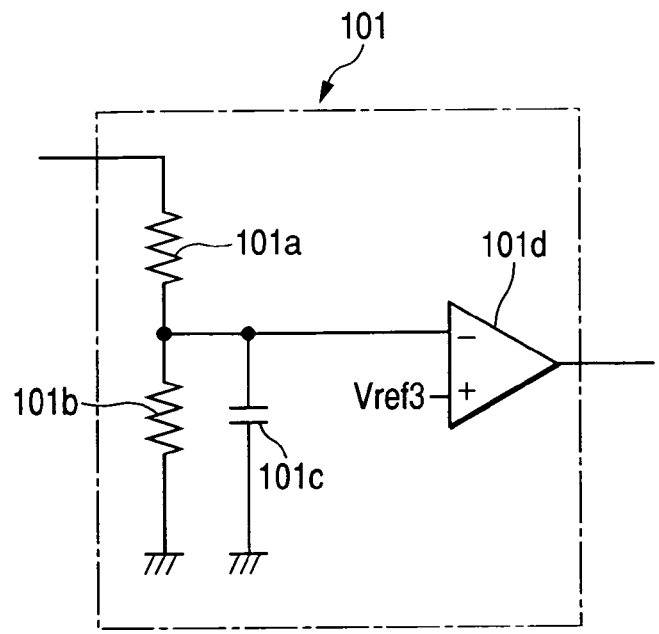
FIG. 2 is a schematic circuit diagram of an engine-start detection circuit shown in FIG. 1.
Figure 3:
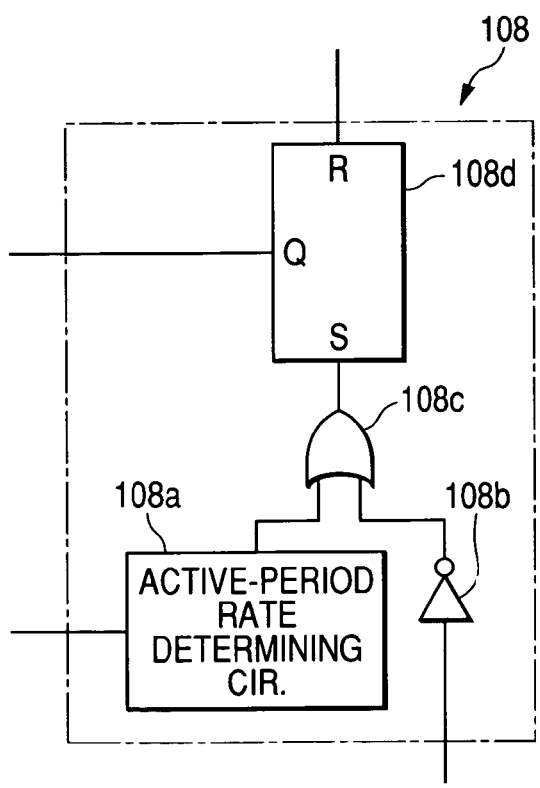
FIG. 3 is a schematic circuit diagram of a masking circuit for gradual-excitation cancellation shown in FIG. 1.

In an embodiment of the power generation control unit related to the present invention, an example is shown which is implemented in an application to a power generation control unit for vehicle that controls a generator mounted on the vehicle and driven by an engine (an internal combustion engine). FIG. 1 schematically shows a circuit diagram of a power generation control unit for vehicle according to the present embodiment. FIG. 2 schematically shows a circuit diagram of an engine-start detection circuit. FIG. 3 schematically shows a circuit diagram of a masking circuit for gradual-excitation cancellation. With reference to FIGS. 1 to 3, detailed description of the present embodiment is provided in the order of its configuration, operation and effects.

First, the configuration of the embodiment is described in detail with reference to FIGS. 1 to 3. As shown in FIG. 1, a power generation control unit 1 for vehicle (hereinafter referred to as a "generation control unit") is connected to a generator 2 for vehicle (hereinafter referred to a "generator") which is connected to a battery 5. The generation control unit 1 is connected to the battery 5 through a warning lamp 3 and a key switch (on-off switch) 4. The generation control unit 1 is connected to the battery 5 only through the key switch 4.

A detailed description is given first on the configuration of the generator 2 connected to the generation control unit 1. The generator 2 is a machine which is driven by a driving force of an engine (not shown) and outputs AC voltage by having its excitation current controlled by the generation control unit 1. The generator 2 includes an excitation winding 20, an armature winding 21 and a rectification circuit 22.

The excitation winding 20 is wound about a rotor (not shown) that rotates with the driving force of the engine, and generates a magnetic flux with a flow of an excitation current therethrough. The excitation winding 20 is connected to the generation control unit 1.

The armature winding 21 is a three-phase winding obtained by connecting phase windings 21a-21c, each wound about an armature iron core (not shown), in a shape of "Y". The armature winding 21 generates three-phase AC voltage by being linked with the magnetic flux generated by the excitation winding 20. Each of open terminals of the phase windings 21a-21c is connected to the rectification circuit 22. The open terminal of the phase winding 21a is also connected to the generation control unit 1.

The rectification circuit 22 converts the three-phase AC voltage generated by the armature winding 21 into DC voltage through three phase full-wave rectification. The rectification circuit 22 is constituted by connecting six diodes 22a-22f so as to form a three-phase bridge.

Cathodes of the upper three diodes 22a-22c of the three-phase bridge are each connected to the generation control unit 1 and a positive terminal of the battery 5. A negative terminal of the battery 5 is so grounded through a vehicle body. Anodes of the lower three diodes 22d-22f of the three-phase bridge are grounded through the vehicle body. Further, a contact between two diodes 22a and 22d, a contact between two diodes 22b and 22e, and a contact between two diodes 22c and 22f are connected to open terminals of the phase windings 21a-21c, respectively.

A detailed configuration of the generation control unit 1 is described below. The generation control unit 1 is a device for controlling the excitation current of the generator 2, so that the generation voltage of the generator 2 falls on a preset regulated voltage (first predetermined voltage).

The generation control unit includes a power circuit 100, an engine-start detection circuit 101, a transistor 102 for driving a warning lamp, voltage divider resistors 103, 104, a comparator 105 for generation voltage detection, a gradual excitation circuit 106, a comparator 107 for gradual-excitation cancellation, a masking circuit 108 for gradual-excitation cancellation, AND circuits 109, 111, an OR circuit 110, a charge pump circuit 112, a transistor 113 for excitation current control, and a reflux diode 114.

The voltage divider resistors 103, 104, the comparator 105 for generation voltage detection, the AND circuit 111, the charge pump circuit 112 and the transistor 113 for excitation current control compose excitation current control means according to the present invention. The gradual excitation circuit 106, the OR circuit 110 and the AND circuit 111 compose gradual excitation means according to the present Invention. The voltage divider resistors 103, 104, the comparator 107 for gradual-excitation cancellation, the AND circuit 109, the OR circuit 110 and the AND circuit 111 compose gradual-excitation cancellation means according to the present invention. The engine-start detection circuit 101 composes internal combustion engine starting means according to the present invention. The masking circuit 108 for gradual-excitation cancellation and the AND circuit 109 compose gradual-excitation cancellation inhibition means according to the present invention.

The power circuit 100 is a circuit for supplying an output voltage from the battery 5 by converting it to a voltage appropriate for the operation of the generation control unit 1. An input terminal of the power circuit 100 is connected to the positive terminal of the battery 5 through the key switch 4, and an output terminal (not shown) of the power circuit 100 is connected to each of the circuits.

The engine-start detection circuit 101 detects engine start based on a voltage generated from the phase winding 21a.

As shown in FIG. 2, the engine-start detection circuit 101 includes two voltage divider resistors 101a, 101b, a smoothing capacitor 101c, and a comparator 101d for engine start detection.

The two voltage divider resistors 101a, 101b are connected in series with each other and divide the generation voltage of the generator 2. Each of the serially connected two voltage divider resistors 101a, 101b is connected, at its one end, to the open terminal of the phase winding 21a shown in FIG. 1, with the other end being grounded through the vehicle body.

The smoothing capacitor 101c is an element for smoothing the generation voltage of the generator 2, which has been divided by the two voltage divider resistors 101a, 101b. The smoothing capacitor 101c is connected, at its one end, to a contact between the two voltage divider resistors 101a, 101b, with the other end being grounded through the vehicle body.

The comparator 101d for engine start detection is an element for comparing the generation voltage of the phase winding 21a, which has been divided by the two voltage divider resistors 101a, 101b, with a preset third reference voltage Vref3. The third reference voltage Vref3 corresponds to an engine start detection voltage (third predetermined voltage). The engine start detection voltage serves as a threshold for detecting an engine start.

When the engine is started, the phase winding 21a generates voltage according to the number of revolutions of the engine. The engine start detection voltage is lower than the voltage generated by the phase winding 21a when the engine is started. When the generation voltage of the phase winding 21a exceeds the engine start detection voltage, the engine is determined as having been started. The third reference voltage Vref3 is set at a value obtained by converting the engine start detection voltage on the basis of a voltage dividing ratio of the two voltage divider resistors 101a, 101b.

An inversion input terminal (−) of the comparator 101 for engine start detection is connected to the contact between the two voltage divider resistors 101a, 101b to which the smoothing capacitor 101c is also connected, and a non-inversion input terminal (+) of the comparator 101d is connected to a power source for the third reference voltage Vref3. An output terminal of comparator 101d for engine start detection is connected to the transistor 102 for driving the warning lamp, the gradual excitation circuit 106, and the masking circuit 108 for gradual-excitation cancellation, which are shown in FIG. 1.

When the engine is in a stopped state, the phase winding 21a generates no voltage. Accordingly, the voltage of the inversion input terminal of the comparator 101d becomes lower than the third reference voltage Vref3 connected to the non-inversion input terminal of the comparator 101d, resulting in that the comparator 101d outputs high-level signals. Contrarily, when the engine is started, the phase winding 21a generates voltage. Accordingly, the voltage of the inversion input terminal of the comparator 101d becomes higher than the third reference voltage Vref3 which is connected to the non-inversion input terminal of the comparator 101d, and thus the comparator 101d outputs low-level signals.

Reference is again made to FIG. 1. The transistor 102 for driving the warning lamp is a switching element which turns on or off the warning lamp 3 by performing switching based on the output from the engine-start detection circuit 101. The warning lamp 3 is an indicator lamp for giving a warning on an engine stop state after insertion of the key switch. A gate and a drain of the transistor 102 are, respectively, connected to the output terminal and the warning lamp 3, and a source is grounded through the vehicle body.

The two voltage divider resistors 103, 104, which are connected in series with each other, play a role of dividing the generation voltage of the generator 2. One end of each of the serially connected resistors 103, 104 is connected to the cathodes of the three diodes 22a-22c, with the other end being grounded through the vehicle body.

The comparator 105 for generation voltage detection is an element for comparing the generation voltage of the generator 2, which has been divided by the two resistors 103, 104, with a preset first reference voltage Vref1 corresponding to the regulated voltage. The regulated voltage is a target value of the generation voltage of the generator 2. The first reference voltage Vref1 is set at a value obtained by converting the regulated voltage on the basis of a voltage dividing ratio of the two voltage divider resistors 103, 104.

An inversion input terminal (−) of the comparator 105 for generation voltage detection is connected to the contact between the two voltage divider resistors 103, 104, and a non-inversion input terminal (+) of the comparator 105 is connected to the first reference voltage Vref1. An input terminal of the comparator 105 is connected to the gradual excitation circuit 106, the masking circuit 108, and the AND circuit 111. When the generation voltage of the generator 2 is larger than the regulated voltage, the voltage at the inversion input terminal of the comparator 105 becomes lower than the first reference voltage Vref1 connected to the non-inversion input terminal of the comparator 105, resulting in that the comparator 105 outputs high-level signals. Contrarily, when the generation voltage of the generator 2 becomes higher than the regulated voltage, the voltage of the inversion input terminal of the comparator 105 becomes higher than the first reference voltage Vref1 connected to the non-inversion input terminal of the comparator 105, and thus the comparator 105 outputs low-level signals.

The gradual excitation circuit 106 outputs pulsed signals of a predetermined frequency for the purpose of excitation, based on the outputs of the engine-start detection circuit 101 and the comparator 105. One input terminal of the gradual excitation circuit 106 is connected to the output terminal of the engine-start detection circuit 101, and the other input terminal is connected to the output terminal of the comparator 105, while an output terminal of the gradual excitation circuit 106 is connected to the masking circuit 108 and the OR circuit 110.

When high-level signals are outputted from the engine-start detection circuit 101, the gradual excitation circuit 106 outputs pulsed signals having a high-level signal ratio (hereinafter referred to as an "on-duty ratio") of about 20%, for example. On the other hand, when low-level signals are outputted from the engine-start detection circuit 101, and high-level signals are outputted from the comparator 105, the gradual excitation circuit 106 gradually increases the on-duty ratio of the pulsed signals.

The comparator 107 for gradual-excitation cancellation is an element for comparing the generation voltage of the generator 2, which has been divided by the two resistors 103, 104, with a reset second reference voltage Vref2 corresponding to a gradual-excitation cancellation voltage (second predetermined voltage) which is a threshold for determining cancellation of excitation. The gradual-excitation cancellation voltage is lower than the regulated voltage and higher than a minimum voltage at which the current consumers (not shown) connected to the battery 5 can be operated. When the generation voltage of the generator 2 is reduced to less than the gradual-excitation cancellation voltage during the gradual excitation, the gradual excitation is cancelled The second reference voltage Vref2 is set at a value obtained by converting the gradual-excitation cancellation voltage on the basis of a voltage dividing ratio of the two resistors 103, 104.

An inversion input terminal (−) of the comparator 107 is connected to the contact between the resistors 103, 104, and a non-inversion input terminal (+) of the comparator 107 is connected to the second reference voltage Vref2, and an output of the comparator 107 is connected to the AND circuit 109.

When the generation voltage of the generator 2 is lower than the gradual-excitation cancellation voltage, the voltage at the inversion input terminal of the comparator 107 becomes lower than the second reference voltage Vref2 connected to the non-inversion input terminal of the comparator 107. The comparator 107 then outputs high-level signals for instructing cancellation of the gradual excitation.

On the other hand, when the generation voltage of the generator 2 becomes higher than the gradual-excitation cancellation voltage, the voltage at the inversion input terminal of the comparator 107 is increased to more than the second reference voltage Vref2 connected to the non-inversion input terminal. As a result, the comparator 107 outputs low-level signals.

The masking circuit 108 outputs signals for masking the gradual-excitation cancellation, based on the output from the engine-start detection circuit 101. As shown in FIG. 3, the masking circuit 108 includes an active-period rate determining circuit 108a, a NOT circuit 108b, an OR circuit 108c, and an RS flip-flop circuit 108d.

The active-period rate determining circuit 108a determines the on-duty ratio (or "on-level period rate") of the pulsed signals outputted from the gradual excitation circuit 106. When the on-duty ratio of the pulsed signals outputted from the gradual excitation circuit 106 is larger than a preset reference on-duty ratio, the active-period rate determining circuit 108a outputs a high-level signal, and otherwise outputs a low-level signal. The reference on-duty ratio is an active-period rate (i.e., "on period") to be referenced for the excitation current, which is equivalent to the amplitude of the excitation current of the generator 2.

Immediately after starting an engine, due to power supply to the starting system or the like, the battery is in bad charging conditions and thus the number of revolutions of the engine is low. For this reason, even when the generator provides a maximum generation, the generation voltage may not reach the regulated voltage. In such circumstances, the inhibition of gradual-excitation cancellation can be reliably released by determining the on-duty ratio.

An input terminal of the active-period rate determining circuit 108a is connected to the output terminal of the gradual excitation circuit 106 shown in FIG. 1, and an output terminal, to one input terminal of the OR circuit 108c. An input terminal of the NOT circuit 108b is connected to the output terminal of the comparator 105 shown in FIG. 1, and an output terminal, to the other input terminal of the OR circuit 108c. An output terminal of the OR circuit 108c is connected to a set terminal S of the RS flip-flop circuit 108d. A reset terminal R of the RS flip-flop circuit 108d is connected to the output terminal of the engine-start detection circuit 101 shown in FIG. 1, and an output terminal Q of the circuit 108d, to the input terminal of the AND circuit 109 shown in FIG. 1.

When high-level signals are outputted from the engine-start detection circuit 101, the RS flip-flop circuit 108d is reset to output low-level signals. Contrarily, when low-level signals are outputted from the comparator 105, or when high-level signals are outputted from the active-period rate determining circuit 108a according to the pulsed signals outputted from the gradual excitation circuit 106, the RS flip-flop circuit 108d is set to output high-level signals.

The AND circuit 109 selectively outputs the output from the comparator 107, based on the output from the masking circuit 108. One input terminal of the AND circuit 109 is connected to the output terminal of the flip-flop circuit 108d shown in FIG. 3, and the other input terminal of the AND circuit 109 is connected to the output terminal of the comparator 107, with its output terminal being connected to the OR circuit 110.

When high-level signals are outputted from the masking circuit 108, the AND circuit 109 outputs the output straight from the comparator 107. Contrarily, when low-level signals are outputted from the masking circuit 108, the AND circuit 109 outputs low-level signals irrespective of the output from the comparator 107.

The OR circuit 110 selectively outputs the output from the gradual excitation circuit 106, based on the output from the AND circuit 109. One input terminal of the OR circuit 110 is connected the output terminal of the gradual excitation circuit 106, and the other input terminal of the OR circuit 110 is connected to the output terminal of the AND circuit 109, with its output terminal being connected to the AND circuit 111.

When high-level signals are outputted from the AND circuit 109, the OR circuit 110 outputs high-level signals, irrespective of the output from the gradual excitation circuit 106. Contrarily, when low-level signals are outputted from the AND circuit 109, the OR circuit 110 outputs pulsed signals as they are outputted from the gradual excitation circuit 106.

The AND circuit 111 selectively outputs the output from the OR circuit 110, based on the output from the comparator 105. One input terminal of the AND circuit 111 is connected to the output terminal of the comparator 105, and the other input terminal of the AND circuit 111 is connected to the output terminal of the OR circuit 110, with its output terminal being connected to the charge pump circuit 112.

When high-level signals are outputted from the comparator 105, the AND circuit 111 outputs the output straight from the OR circuit 110. Contrarily, when low-level signals are outputted from the comparator 105, the AND circuit 111 outputs low-level signals, irrespective of the output from the OR circuit 110.

The charge pump circuit 112 plays a roll of converting the output from the AND circuit 110 to high voltage that enables the transistor 113 for excitation current control to perform switching. An input terminal of the charge pump circuit 112 is connected to the output terminal of the AND circuit 110, and an output terminal thereof, to the transistor 113.

The transistor 113 for excitation current control is a switching element for controlling excitation current that flows through the excitation winding 20, by performing switching based on the high voltage outputted from the charge pump circuit 112. The switching performed by the transistor 113 controls an active (or "on") rate at which the exciting current becomes active (i.e., flows), thereby controlling the excitation current.

A gate of the transistor 113 is connected to the output terminal of the charge pump circuit 112, its drain, to the cathodes of the diodes 22a-22c, and its source, to one end of the excitation winding 20. The other end of the excitation winding 20 is grounded through the vehicle body.

The reflux diode 114 is an element that passes flux current generated at the excitation winding 20 when the transistor 113 is turned off. A cathode of the reflux diode 114 is connected to one end of the excitation winding 20, and an anode thereof, to the other end of the excitation winding 20.

An operation of the apparatus is described in detail below with reference to FIGS. 1 to 3. Referring to FIG. 1, when the key switch 4 is inserted, the battery 5 is connected to the power circuit 100. The power circuit 100 converts the output voltage of the battery 5 to a voltage appropriate for an operation and supplies the resultant voltage to the individual circuits. Upon supply of the voltage, the individual circuits start their operations.

Shortly before an engine start, the phase winding 21a has not yet generated voltage. Thus, the engine-start detection circuit 101 outputs high-level signals. When the output of the engine-start detection circuit 101 reaches a high level, the transistor 102 for driving the warning lamp is turned on to light up the warning lamp 3. At this time, the generator 2 also has not yet generated voltage.

The comparator 105 then outputs high-level signals. When the output of the comparator 105 reaches a high level, the gradual excitation circuit 106 outputs pulsed signals with an on-duty ratio at about 20%, for example, while the masking circuit 108 for gradual-excitation cancellation outputs low-level signals.

When the output of the masking circuit 108 turns to a low level, the AND circuit 109 outputs low-level signals, irrespective of the output from the comparator 107. As a result, the gradual-excitation cancellation is inhibited.

The OR circuit 110, on the other hand, outputs the pulsed signals of about 20% on-duty as they are outputted from the gradual excitation circuit 106, since the output level of the AND circuit 109 is low.

Since the output level of the comparator 105 is high, the AND circuit 111 outputs the pulsed signals of about 20% on-duty as they are outputted from the OR circuit 110.

The charge pump circuit 112 then performs switching of the transistor 113, according to the pulsed signals of about 20% on-duty outputted from the AND circuit 111. As a result, excitation current in conformity with the pulsed signals and substantially at a constant level passes through the excitation winding 20.

When the engine begins revolution being operated by the starting system, voltage generation starts in the phase winding 21a. When the generation voltage is increased to more than the engine start detection voltage, the engine-start detection circuit 101 outputs low-level signals.

When the output level of the engine-start detection circuit 101 turns low, the transistor 102 for driving the warning lamp is turned off so as to also turn off the warning lamp 3. At this moment, the generation voltage of the generator 2 is not sufficiently high but lower than the regulated voltage. The output level of the comparator 105 thus remains high.

When the output level of the engine-start detection circuit 101 turns low, and the output level of the comparator 105 turns high, the gradual excitation circuit 106 gradually enhances the on-duty ratio of the pulsed signals, which, however, is still smaller than the reference on-duty ratio.

Accordingly, in case the output of the engine-start detection circuit 101 is reduced to a low level, the RS flip-flop circuit 108d in the masking circuit 108 is not set, and thus the output remains at a low level. Since the output level of the masking circuit 108 is low, the output of the AND circuit 109 also remains at a low level, irrespective of the output from the comparator 107. As a result, the gradual-excitation cancellation is continuingly inhibited.

Since the output level of the AND circuit 109 is low, the OR circuit 110 outputs the pulsed signals with gradually increasing the on-duty ratio as they are outputted from the gradual excitation circuit 106.

Since the output level of the comparator 105 is high, the AND circuit 111 outputs the pulsed signals with gradually increasing the on-duty ratio as they are outputted from the OR circuit 110.

The charge pump circuit 112 then performs switching of the transistor 113, according to the pulsed signals with gradually increasing the on-duty ratio. As a result, the excitation current that flows through the excitation winding 20 gradually increases with the on-duty ratio of the pulsed signals, thereby performing gradual excitation. Accordingly, the generation voltage also increases gradually.

Thereafter, the number of revolutions of the engine is raised up, and the generation voltage of the generator 2 is also raised up, exceeding the regulated voltage. In response, the comparator 105 outputs low level signals.

When the output level of the engine-start detection circuit 101 and the output level of the comparator 105 have both turned low, the masking circuit 108 outputs high-level signals.

The masking circuit 108 also outputs high-level signals when the on-duty ratio of the pulsed signals outputted from the gradual excitation circuit 106 exceeds the reference on-duty ratio, prior to the increase of the generation voltage of the generator 2 over the regulated voltage.

When the output from the masking circuit 108 has reached a high level, the AND circuit 109 outputs the output straight from the comparator 107. As a result, the inhibition of gradual-excitation cancellation is released.

After the elimination of the inhibition of the gradual-excitation cancellation, when the generation voltage of the generator 2 becomes lower than the gradual-excitation cancellation voltage due to the Increase of the power consumption by the current consumers (not shown), the comparator 107 outputs high-level signals. Since the output from the masking circuit 108 is at a high level, the AND circuit 109 outputs the high-level signals as they are outputted from the comparator 107.

Since the output from the AND circuit 109 is at a high level, the OR circuit 110 outputs the high-level signals as they are outputted from the AND circuit 109, irrespective of the output from the gradual excitation circuit 106.

Since the output from the OR circuit 110 is at a high level, the AND circuit 111 outputs the output straight from the comparator 105. As a result, the gradual excitation is cancelled.

The charge pump circuit 112 then turns on the transistor 113 according to the output from the comparator 105 without performing gradual excitation, so that the excitation current flowing through the excitation winding 20 drastically increases to raise the generation voltage.

Until the engine is stopped afterwards and the output level of the engine-start detection circuit 101 turns low, the output from the masking circuit 108 remains at a high level, and thus the gradual-excitation cancellation is not inhibited.

Finally, the effects of the present embodiment are described in detail.

According to the present embodiment, the gradual-excitation cancellation can be inhibited during the initial gradual excitation operation after the engine start has been detected. This enables to suppress a drastic change in drive torque of the generator 2, which occurs with the cancellation of the gradual excitation during the initial gradual excitation operation immediately after the engine start. Accordingly, in the unstable conditions immediately after starting, the engine stop due to the drastic change in the drive torque of the generator 2 can be prevented.

According to the present embodiment, the engine can be determined as having been started when the generation voltage of the generator 2 exceeds the engine start detection voltage. Specifically, since the generation voltage of the generator 2 changes with the number of revolutions of the engine, the engine start can be reliably detected by comparing the generation voltage with the engine start detection voltage.

According to the present embodiment, the timing for releasing the inhibition of the gradual-excitation cancellation can be determined based on the active-period rate equivalent to the generation voltage and the excitation current. Therefore, the inhibition of the gradual-excitation cancellation can be efficiently released without having to continue the inhibition for more than necessary. The number of revolutions of an engine immediately after starting is unstable, which is thereafter stabilized with the passage of time. Since the generation voltage is gradually increased immediately after an engine start owing to the gradual excitation operation, the inhibition of the gradual-excitation cancellation can be efficiently released based on the active-period rate equivalent to the generation voltage and the excitation current.

According to the present embodiment, the engine stop in a vehicle immediately after starting the engine, which is induced by the drastic change in the drive torque of the generator 2, can be prevented. Accordingly, the startability of an engine in a vehicle can be enhanced.

Modifications

It should be appreciated that although, in the present embodiment, an example is provided, in which the engine start is detected based on the amplitude of a generation voltage of the phase winding 21*a*, this example does not provide a limitation. For example, since the generation voltage of the phase winding 21 is an AC voltage, an engine start may be detected based on its frequency. In such a case, the engine-start detection circuit shown in FIG. 1 may be realized by replacing the circuit configuration shown in FIG. 2 with a circuit configuration shown in FIG. 4.

Figure 4:
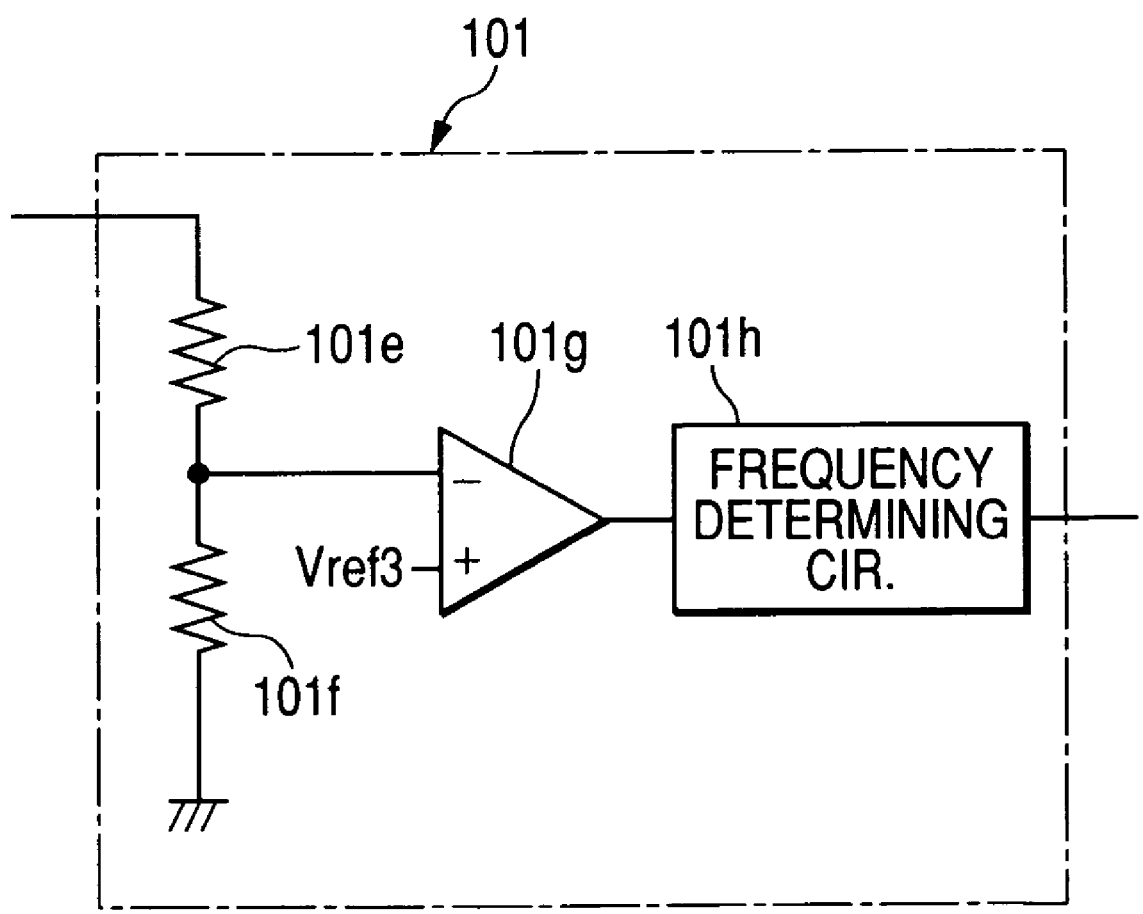
FIG. 4 is a schematic circuit diagram of the engine-start detection circuit shown in FIG. 1 implemented in another embodiment.

The engine-start detection circuit shown in FIG. 4 includes two voltage divider resistors 101*e*, 101*f*, a comparator 101*g*, and a frequency determining circuit 101*h*.

The two resistors 101*e*, 101*f* divide the generation voltage of the generator 2, being serially connected with each other. One end of each of the two serially connected resistors 101*e*, 101*f* is connected to the open terminal of the phase winding 21*a*, and the other end is grounded through the vehicle body.

An inversion input terminal (−) of the comparator 101*g* is connected to a contact between the voltage divider resistors 101*e*, 101*f*, and a non-inversion input terminal (+) of the comparator 101*g* is connected to the preset third reference voltage Vref3. The comparator 101*g* serves as an element for comparing the generation voltage at the phase winding 21*a*, which has been divided by the two resistors 101*e*, 101*f*, with the third reference voltage Vref3. The third reference voltage Vref3 serves as a threshold that is a reference for converting the generation voltage at the phase winding 21*a* into pulsed signals appropriate for its AC frequency. The comparator 101*g* outputs high-level signals when the generation voltage at the phase winding 21*a* is lower than the third reference voltage Vref3, and outputs low-level signals when higher.

An input terminal of the frequency determining circuit 101*h* is connected to an output terminal of the comparator 101*g*, with its output terminal being connected to the transistor 102 for driving the warning lamp, the gradual excitation circuit 106, and the masking circuit 108 for gradual-excitation cancellation. The frequency determining circuit 101h determines whether or not an engine has been started, based on the AC frequency of the generation voltage obtained with the output from the comparator 101g, and outputs signals according to the results of the determination. An engine start thus can be detected as in the circuit configuration shown in FIG. 2.

The present invention may be embodied in several other forms without departing from the spirit thereof. The embodiments and modifications described so far are therefore intended to be only illustrative and not restrictive, since the scope of the present invention is defined by the appended claims rather than by the description preceding them. All changes that fall within the metes and bounds of the claims, or equivalents of such metes and bounds, are therefore intended to be embraced by the claims.

What is claimed is:

1. An apparatus for controlling power to be generated by a generator driven by an internal combustion engine, the apparatus comprising:
   excitation current control means for controlling an excitation current to be fed to the generator so that the generator produces the power whose voltage is set to a first predetermined voltage value;
   gradual excitation means for exciting current to increase gradually when the excitation current is controlled by the excitation current control means;
   gradual-excitation cancellation means for canceling the gradual excitation in cases where the voltage of the power generated by the generator becomes less than a second predetermined voltage value lower than the first predetermined voltage value during the gradual excitation performed by the gradual excitation means;
   start detecting means for detecting that the internal combustion engine has been started; and
   gradual-excitation cancellation inhibiting means for inhibiting the gradual-excitation cancellation to be performed by the gradual-excitation cancellation means, during the gradual excitation first performed by the gradual excitation means which comes after the start of the internal combustion engine to be detected by the start detecting means.

2. The apparatus of claim 1, wherein the generator is mounted on a vehicle.

3. The apparatus of claim 1, wherein the gradual-excitation cancellation inhibiting means comprises inhibition releasing means for releasing the inhibition of the gradual-excitation cancellation on the basis of either the voltage of the power to be generated or the excitation current.

4. The apparatus of claim 3, wherein the inhibition releasing means is configured to release the inhibition of the gradual-excitation cancellation in cases where the voltage of the power to be generated exceeds the first predetermined voltage value.

5. The apparatus of claim 3, wherein the inhibition releasing means is configured to release the inhibition of the gradual-excitation cancellation in cases where the excitation current exceeds a predetermined current value.

6. The apparatus of claim 5, wherein
   the excitation current control means is configured to control the excitation current by adjusting an active-period rate at which the excitation current becomes active and
   the inhibition releasing means include means for deciding an amplitude of the excitation current based on the active-period rate of the excitation current.

7. An apparatus for controlling power to be generated by a generator driven by an internal combustion engine, the apparatus comprising:
   an excitation current control unit controlling an excitation current to be fed to the generator so that the generator produces the power whose voltage is set to a first predetermined voltage value;
   a gradual excitation unit exciting current to increase gradually when the excitation current is controlled by the excitation current control unit;
   a gradual-excitation cancellation unit canceling the gradual excitation in cases where the voltage of the power generated by the generator becomes less than a second predetermined voltage value lower than the first predetermined voltage value during the gradual generation performed by the gradual excitation unit;
   a start detecting unit detecting that the internal combustion engine has been started; and
   a gradual-excitation cancellation inhibiting unit inhibiting the gradual-excitation cancellation to be performed by the gradual-excitation cancellation unit, during the gradual excitation first performed by the gradual excitation unit which comes after the start of the internal combustion engine to be detected by the start detecting unit.

8. The apparatus of claim 7, wherein the generator is mounted on a vehicle.

9. The apparatus of claim 7, wherein the start detecting unit is configured to detect the start of the internal combustion engine based on an amplitude of the voltage of the power generated by the generator.

10. The apparatus of claim 7, wherein the start detecting unit is configured to detect the start of the internal combustion engine based on a frequency of the voltage of the power generated by the generator.

11. The apparatus of claim 7, wherein the gradual-excitation cancellation inhibiting unit comprises an inhibition releasing unit releasing the inhibition of the gradual-excitation cancellation on the basis of either the voltage of the power to be generated or the excitation current.

12. The apparatus of claim 11, wherein the inhibition releasing unit is configured to release the inhibition of the gradual-excitation cancellation in cases where the voltage of the power to be generated exceeds the first predetermined voltage value.

13. The apparatus of claim 11, wherein the inhibition releasing unit is configured to release the inhibition of the gradual-excitation cancellation in cases where the excitation current exceeds a predetermined current value.

14. The apparatus of claim 13, wherein
   the excitation current control unit is configured to control the excitation current by adjusting an active-period rate at which the excitation current becomes active and
   the inhibition releasing unit include means for deciding an amplitude of the excitation current based on the active-period rate of the excitation current.

15. The apparatus of claim 14, wherein the gradual-excitation cancellation inhibiting unit comprises
   a masking circuit providing a signal for masking an output of the gradual-excitation canceling unit, on the basis of an output of the start detecting unit; and
   a selective output circuit selectively outputting the output of the gradual-excitation canceling unit, on the basis of the masking signal from the masking circuit.

16. The apparatus of claim 15, wherein the masking circuit comprises a determining circuit configured to make a comparison between an on-duty ratio of an output of the gradual excitation unit and a reference on-duty ratio which is preset, whereby the determining circuit outputs a first-logical-level signal in response to a determination that the on-duty ratio of the output of the gradual excitation unit is larger than the dereference on-duty ratio and a second-logical-level signal in response to a determination that the on-duty ratio of the output of the gradual excitation unit is equal to or less than the reference on-duty ratio; and a sequence circuit configured to respond to not only the output of the start detecting unit such that the sequence circuit is reset to output a signal of the second-logical-level but also either the voltage of the power to be generated or, based on the output of the gradual excitation unit, an output of the determining circuit such that the sequence circuit is made set, in response to a situation in which the voltage of the power to be generated exceeds the first predetermined voltage value or the output of the determining circuit is at the first-logical level, so as to output a signal of the first-logical level to the selective output circuit.

17. A method of controlling power to be generated by a generator driven by an internal combustion engine, comprising steps of:

controlling an excitation current to be fed to the generator so that the generator produces the power whose voltage is set to a first predetermined voltage value;

enabling the excitation current to increase gradually when the excitation current is controlled;

canceling the gradual excitation in cases where the voltage of the power generated by the generator becomes less than a second predetermined voltage value lower than the first predetermined voltage value during the gradual excitation;

detecting that the internal combustion engine has been started; and inhibiting the gradual-excitation cancellation to be performed, during the gradual excitation first performed in the gradual excitation step which comes after the start of the internal combustion engine to be detected in the start detecting step.

18. The method of claim 17, wherein the gradual-excitation cancellation inhibiting step includes a step of releasing the inhibition of the gradual-excitation cancellation on the basis of either the voltage of the power to be generated or the excitation current.

* * * * *